United States Patent
Nadgowda (10) Patent No.: US 10,565,006 B2
(45) Date of Patent: Feb. 18, 2020

(54) PLATFORM FOR ANALYTIC APPLICATIONS

(71) Applicant: International Business Machines Corporation, Armonk, NY (US)

(72) Inventor: Shripad J. Nadgowda, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 15/218,296

(22) Filed: Jul. 25, 2016

(65) Prior Publication Data
US 2018/0025019 A1   Jan. 25, 2018

(51) Int. Cl.
*G06F 9/48* (2006.01)

(52) U.S. Cl.
CPC ................... *G06F 9/4843* (2013.01)

(58) Field of Classification Search
CPC ............ G06F 17/30501; G06F 9/4843; G06F 17/30489
USPC ....................................................... 707/692
See application file for complete search history.

(56) References Cited

U.S. PATENT DOCUMENTS

| | | | | |
|---|---|---|---|---|
| 6,775,682 B1 * | 8/2004 | Ballamkonda | .... | G06F 16/24556 |
| 8,290,972 B1 * | 10/2012 | Deshmukh | ........ | G06F 17/30489 707/758 |
| 9,003,200 B1 * | 4/2015 | Gardner | .............. | G06F 11/1453 713/189 |
| 10,223,377 B1 * | 3/2019 | Moghe | ................ | G06F 16/1727 |
| 2011/0307447 A1 * | 12/2011 | Sabaa | ............... | G06F 17/30489 707/637 |
| 2013/0290277 A1 * | 10/2013 | Chambliss | ........ | G06F 17/30489 707/692 |
| 2015/0154220 A1 * | 6/2015 | Ngo | .................. | G06F 17/30194 707/609 |
| 2015/0254299 A1 * | 9/2015 | Saliba | ............... | G06F 17/30159 707/691 |
| 2016/0042007 A1 | 2/2016 | Vijayan et al. | | |
| 2016/0299818 A1 * | 10/2016 | Vijayan | ............... | G06F 11/1453 |
| 2017/0147649 A1 * | 5/2017 | Aronovich | ........ | G06F 17/30489 |

OTHER PUBLICATIONS

Wikipedia, Analytica, https://en.wikipedia.org/wiki/Analytica_(software), Oct. 15, 2015.

* cited by examiner

*Primary Examiner* — Jensen Hu
(74) *Attorney, Agent, or Firm* — Ryan, Mason & Lewis, LLP (57) ABSTRACT

A computer-implemented method includes identifying duplicate items of data in a dataset on which a computation task is to be performed by segmenting the dataset into multiple segments and performing a deduplication operation on each of the multiple segments, as well as removing the duplicate items of data in the dataset from the computation task. Such a method also includes performing the computation task on the remaining items of data in the dataset, wherein the remaining items of data comprise unique items of data in the dataset, and aggregating the results of the computation task and memoized computation results corresponding to the duplicate items of data to generate a complete computation result for the dataset. Further, such a method includes outputting the complete computation result for the dataset to a user.

18 Claims, 4 Drawing Sheets

PLATFORM FOR ANALYTIC APPLICATIONS

FIELD

The present application generally relates to information technology, and, more particularly, to analytic application technology.

BACKGROUND

Existing approaches for caching partial results include the use of memoization techniques. As used herein, memoization refers to one or more optimization techniques applied to computer programs for purposes of accelerating or speeding-up the programs. However, existing memoization approaches provide limited effectiveness in situations involving large volumes of data. Additionally, challenges are presented by duplication in data. For example, when data are consumed by analytics applications, pre-defined computations can be repeatedly performed on the data. Accordingly, in such scenarios, caching results can be increasingly time-consuming and costly.

SUMMARY

In one embodiment of the present invention, techniques for providing analytic application platforms are provided. An exemplary computer-implemented method can include steps of identifying one or more duplicate items of data in a dataset on which a computation task is to be performed by (i) segmenting the dataset into multiple segments and (ii) performing a deduplication operation on each of the multiple segments; removing the one or more duplicate items of data in the dataset from the computation task; performing the computation task on the remaining items of data in the dataset, wherein the remaining items of data comprise unique items of data in the dataset; aggregating (i) the results of the computation task and (ii) one or more memoized computation results corresponding to the one or more duplicate items of data to generate a complete computation result for the dataset; and outputting the complete computation result for the dataset to a user.

In another embodiment of the invention, an exemplary computer-implemented method can additionally include caching the results of the computation task for subsequent use as a memoized computation result.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for providing efficient analytic application platforms. At least one embodiment of the invention includes performing job deduplication and/or compute deduplication to optimize computations for duplication data and reduce compute cycles. Such an embodiment can include identifying duplicate data blocks in a dataset (such as partial and/or intermediate results, for example) on which a computation is to be performed. Such identification aspects can include implementing data deduplication techniques including hash matching for approximate data matching, as well as deduplication based on spatial and/or temporal locality.

Additionally, one or more embodiments of the invention can include eliminating task computations on identified duplication data and aggregating the subsequent results so as to ultimately generate the task computations for the complete set of data with greater efficiency. As also detailed herein, at least one embodiment of the invention can include generating a system-wide memoization technique (that includes caching the partial results) to further optimize the computations for unique tasks. System-wide memoization can include, for example, using the results from a function which is running in parallel and operating on the same set of data, or using the computational results from a function which has completed recently and is cached. Further, one or more embodiments of the invention can be implemented on top of a data deduplication system.

Figure 1:
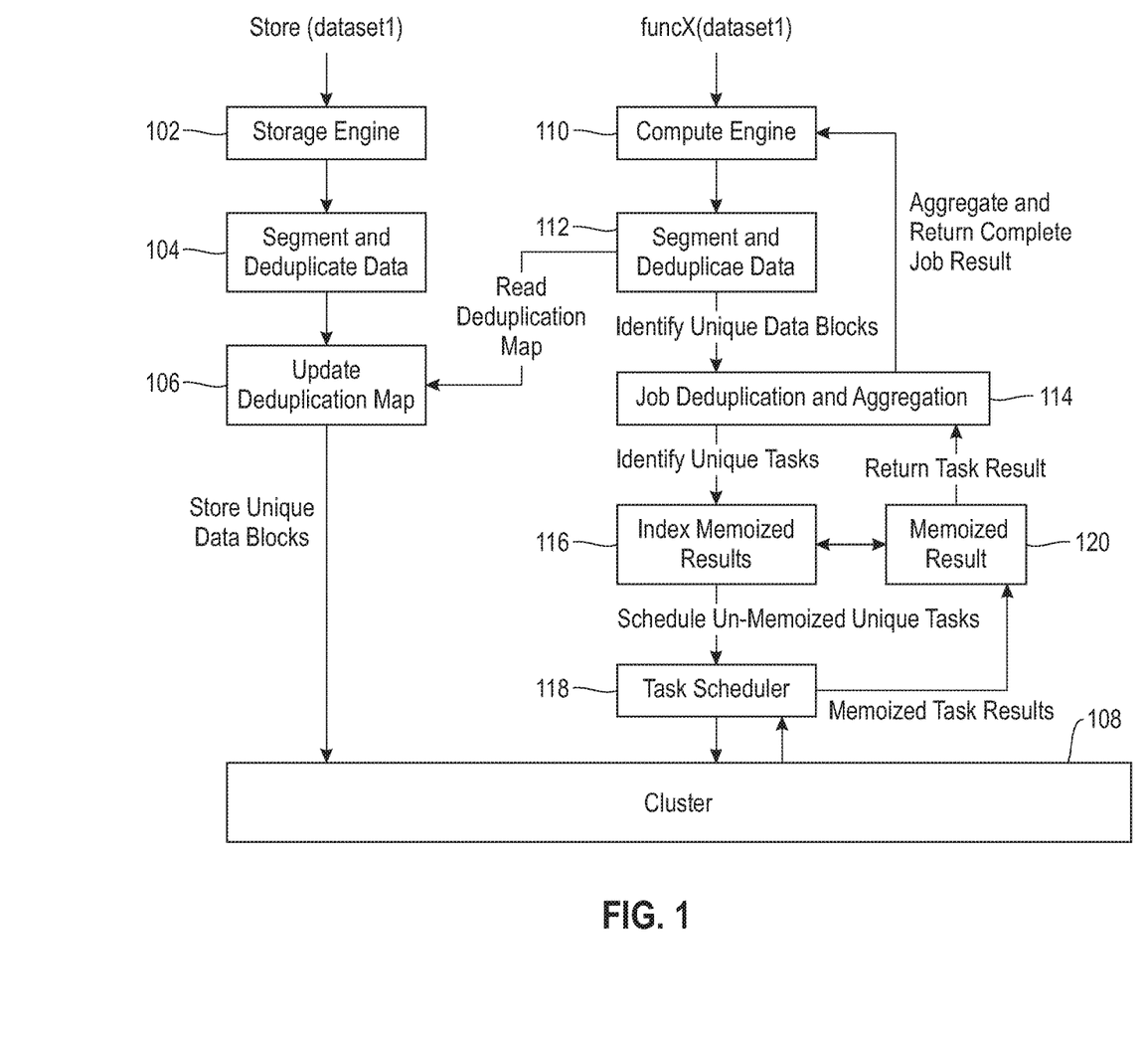
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a storage engine 102, which obtains a dataset (dataset1). Upon storing the dataset, storage engine 102, via data segmentation and duplication component 104, segments the dataset into (fixed or variable sized) blocks, and deduplicates the dataset to identify unique blocks. Additionally, the storage engine 102, via deduplication map updating component 106, can update a resulting deduplication map, and place and persist unique data blocks in a cluster 108. The deduplication map can be created, for example, from a clean state (that is, the map is continuously updated from the first data block). As depicted in FIG. 1, the cluster 108 can include a set of compute nodes which are able to participate in storage and computational tasks.

FIG. 1 also depicts a compute engine 110. As illustrated, for a given dataset (dataset1), the compute engine 110, via data segmentation and duplication component 112, reads the deduplication map updated by component 106 and identifies duplicate data blocks. Such identified unique data blocks are provided to a job deduplication and aggregation component 114 of the compute engine 110, which identifies unique tasks. Further, component 114 provides the identified unique tasks to a memoized results indexing component 116, which, for unique tasks, indexes memoized results and checks to determine whether or not each such task has already been computed. Un-memoized tasks are then scheduled, via a task schedule component 118, to run on the cluster 108. The subsequent results are then memoized and/or cached via component 120 and provided to component 114. Component 114 can then combine all task results and return a job result (to the compute engine 110).

As noted above, component 120 implements memoization to cache results, which can be cached for every task on the unique data blocks across all jobs. In one or more embodiments of the invention, the size of such memoization can be controlled and/or follow standard replacement policies. Example replacement policies can example, for instance, Least Recently Used (LRU), and/or Least Frequently Used (LFU). Additional advantages of an example embodiment of the invention such as depicted in FIG. 1 can include compute acceleration and storage optimization. Specifically, compute acceleration includes eliminating repeated computations on duplicate data and rendering deduplication computations available across jobs. Further, storage optimization includes eliminating a need for temporary storage during computation for duplicate jobs, and reducing disk input/output (I/O) for duplicate data.

Figure 2:
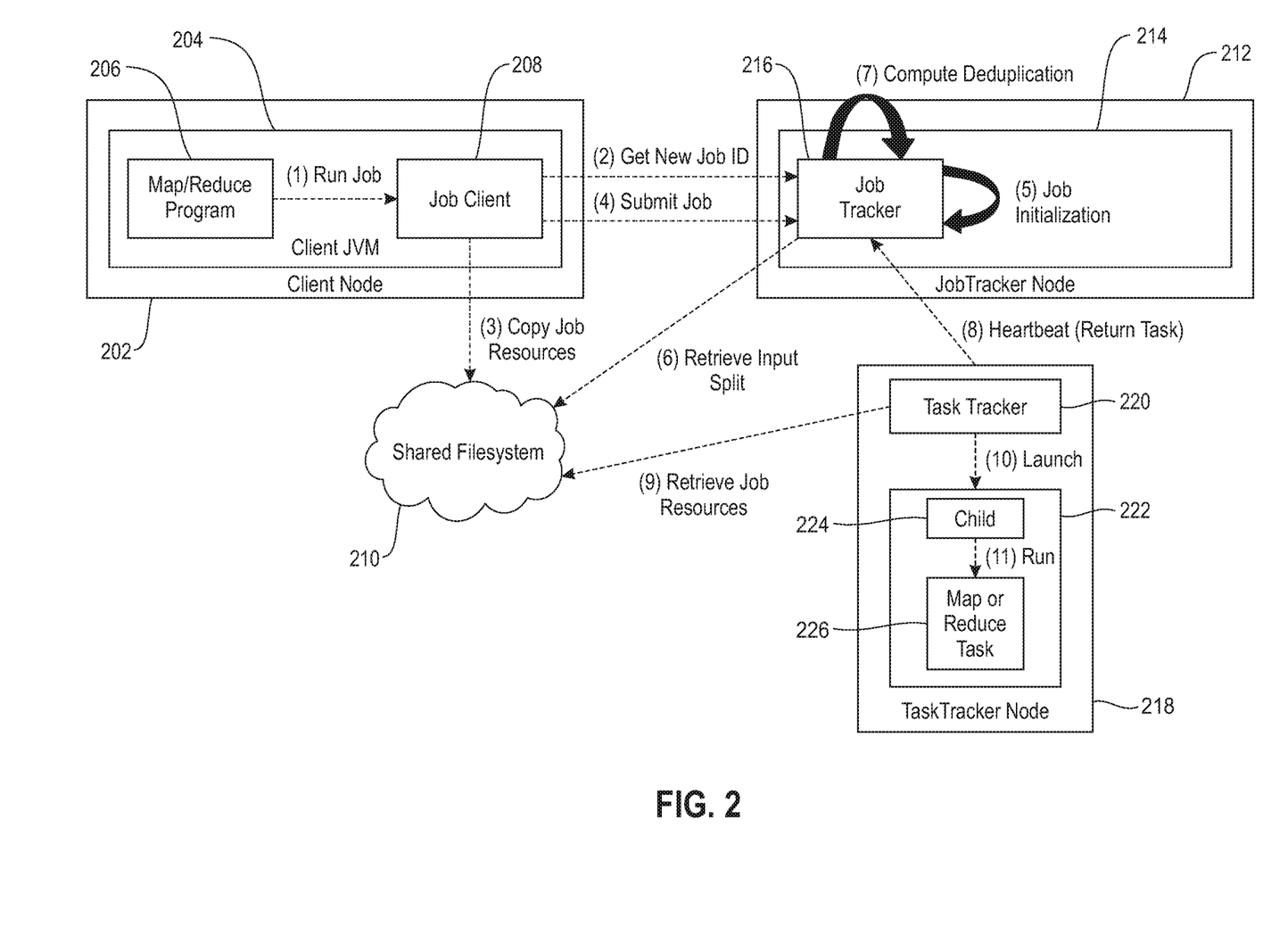
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts an embodiment of the invention that can be carried out within a distributed storage and processing map/reduce context (such as, for example, in Hadoop®). Specifically, FIG. 2 depicts a client Java virtual machine (JVM) 204 executing on a client node 202. On the client JVM 204, a map/reduce program 206 runs a job via job client 208. The job client obtains a new job identifier (ID), copies the job resources to a shared filesystem 210, and submits the job to a job tracker 216.

As illustrated, the job tracker 216 executes on component 214, which executes on job tracker node 212. Components 214 and 222 are JVM instances at the job tracker node 212 and task tracker node, 218 respectively. Additionally, the job tracker 216 initializes the job, retrieves an input split from the shared filesystem 210, and computes deduplication for the job. The input split is part of the complete input which is scheduled for computation on this task tracker node.

Additionally, FIG. 2 also depicts a task tracker node 218, which includes a task tracker 220 and component 222 (as noted above). The task tracker 220 returns a task to the job tracker 216, retrieves job resources from the shared filesystem 210, and launches the task in connection with component 222. As illustrated in FIG. 1 (step 8), "heartbeat" refers to a continuously-probed message used to ensure the healthy state of the target node. If there is no response to a heartbeat probe message from a node, that node is presumed 'down' or 'dead.' Further, executing on component 222, a child component 224 runs the launched task map or reduce task 226.

Additionally, when data are stored on the shared filesystem 210, data can be segmented, and checksum can be stored with every segment in a separate file. Accordingly, one or more embodiments of the invention do not need to explicitly store the deduplication map. Also, at least one embodiment of the invention can include deduplicating map results and scheduling reduce tasks uniquely.

Further, during segmentation, there is a possibility that a dataset record (a JavaScript object notation (JSON) object, an image, etc.) can be split across two segments. To ensure accuracy, one or more embodiments of the invention can include checking the completeness of the records within a segment, and for any incomplete record found, disabling task deduplication. At least one embodiment of the invention can also include building a variable-sized block segmentation (using techniques such as, for example, Rabin fingerprinting) to ensure the record completeness. For native data types (such as integers, floats etc.), no modifications would be required. Additionally, in one or more embodiments of the invention, segmentation is performed prior to serialization, and thereby it can be assumed that serialized records are always in their entirety within a segment/block.

At least one embodiment of the invention can also include implementation within an internet of things (IoT) cloud. In an IoT system, there can be significant data duplication originating from the sensors. Because such sensors are often components of a specialized system, they can operate the same (or limited) functions on the data. As such, an example embodiment of the invention can be integrated at the edge or in the cloud of such a system for optimization.

Figure 3:
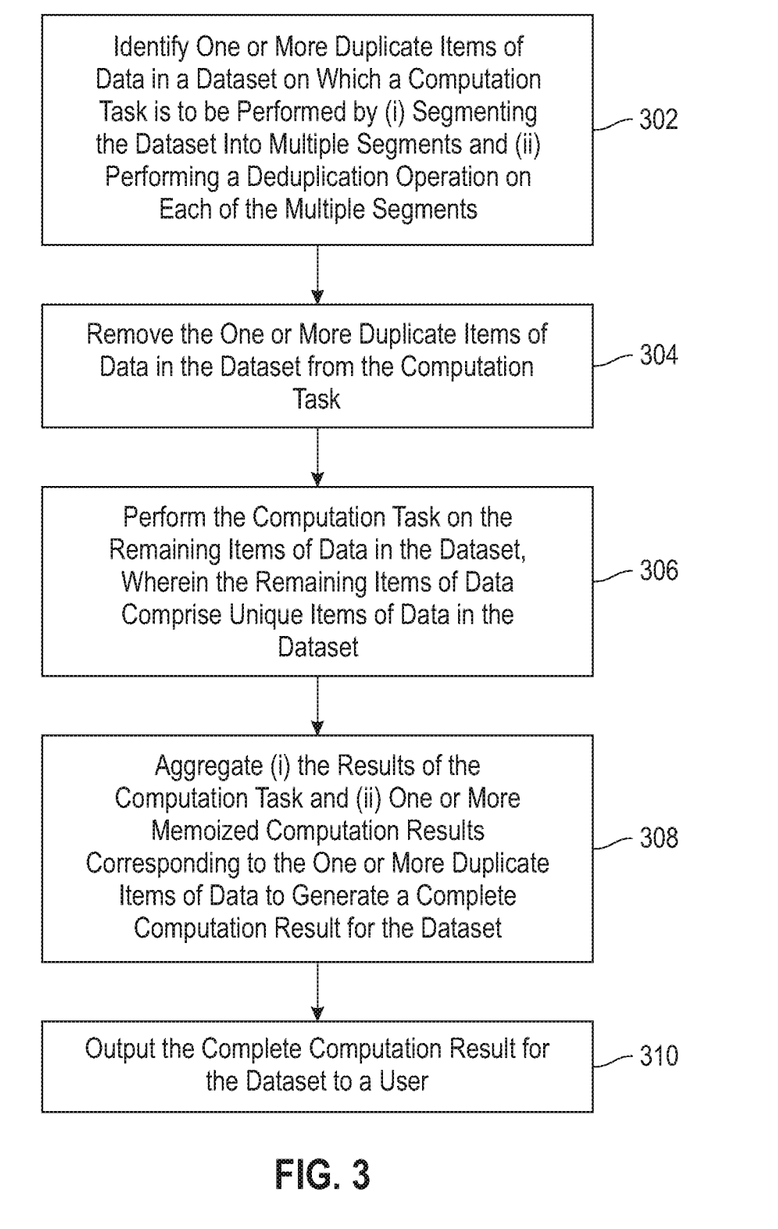
FIG. 3 is a flow diagram illustrating techniques according to an embodiment of the invention.

FIG. 3 is a flow diagram illustrating techniques according to an embodiment of the present invention. Step 302 includes identifying one or more duplicate items of data in a dataset on which a computation task is to be performed by (i) segmenting the dataset into multiple segments and (ii) performing a deduplication operation on each of the multiple segments. The deduplication operation can include performing a hash matching operation on each of the multiple segments of the dataset, as well as analyzing spatial and temporal locality across each of the multiple segments of the dataset. Additionally, performing a deduplication operation can include reading a stored deduplication map. Further, at least one embodiment of the invention can include updating the stored deduplication map.

Also, in one or more embodiments of the invention, the multiple segments can include multiple data blocks, wherein each of the multiple data blocks can include a data block of fixed size or a data block of variable size.

Step 304 includes removing the one or more duplicate items of data in the dataset from the computation task. Step 306 includes performing the computation task on the remaining items of data in the dataset, wherein the remaining items of data comprise unique items of data in the dataset. Additionally, at least one embodiment of the invention includes determining whether a computation task on each of the remaining items of data has been previously performed.

Step 308 includes aggregating (i) the results of the computation task and (ii) one or more memoized computation results corresponding to the one or more duplicate items of data to generate a complete computation result for the dataset. Also, at least one embodiment of the invention includes aggregating the one or more memoized computation results corresponding to the one or more duplicate items of data. Such aggregation can ensure that the computation task is carried out for the complete dataset, as even duplicate items that have been previously removed (via step 304, for instance) may be ultimately required within and/or by the dataset. Step 310 includes outputting the complete computation result for the dataset to a user.

Also, an additional embodiment of the invention includes identifying one or more duplicate data blocks in a dataset on which a computation task is to be performed by (i) segmenting the dataset into multiple segments and (ii) performing a deduplication operation on each of the multiple segments. Such an embodiment also includes removing the one or more duplicate data blocks in the dataset from the computation task, performing the computation task on the remaining data blocks in the dataset, and caching the results of the computation task for subsequent use as a memoized computation result. Further, such an embodiment includes aggregating (i) the results of the computation task and (ii) one or more memoized computation results corresponding to the one or more duplicate data blocks to generate a complete computation result for the dataset, and outputting the complete computation result for the dataset to a display. Optionally, such an embodiment can also include controlling the size of the memoized computation results.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
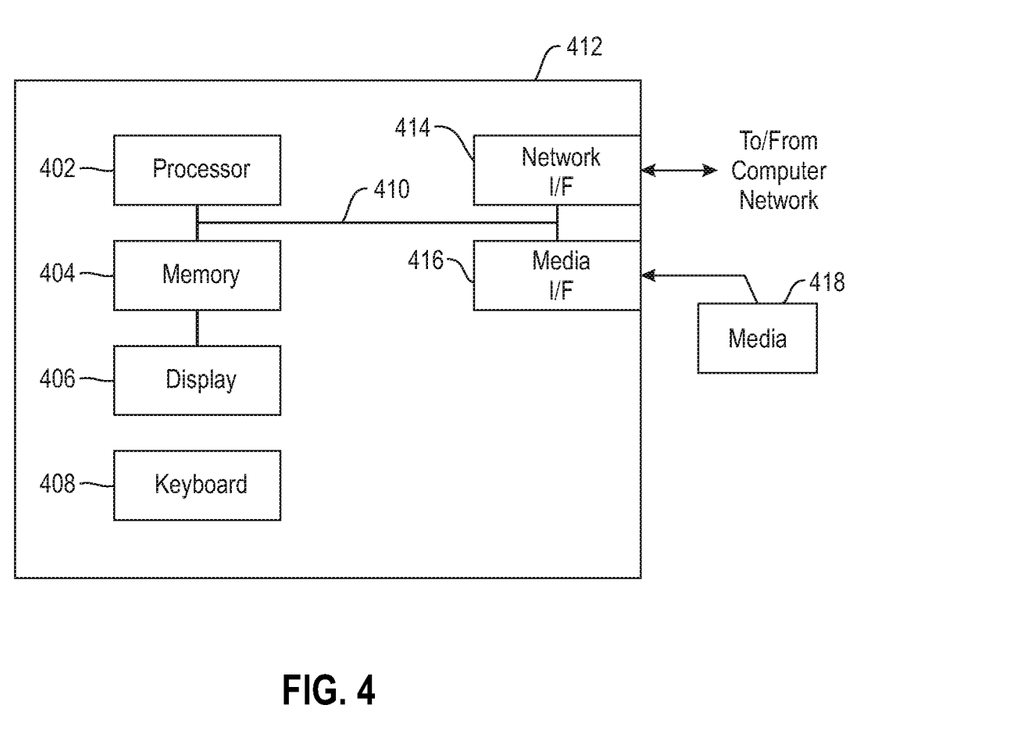
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating a system-wide memoization technique of caching partial results to optimize the computation for unique tasks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying one or more duplicate items of data in a dataset on which a computation task is to be performed by (i) segmenting the dataset into multiple segments, (ii) analyzing the items of data within each segment for completeness, and (iii) performing a deduplication operation on each of the multiple segments not containing an incomplete item of data, as determined by said analyzing;
   removing the one or more duplicate items of data in the dataset from the computation task;
   performing the computation task on the remaining items of data in the dataset, wherein the remaining items of data comprise unique items of data in the dataset;

aggregating (i) the results of the computation task and (ii) one or more memoized computation results corresponding to the one or more duplicate items of data to generate a complete computation result for the entire dataset; and outputting the complete computation result for the entire dataset to a user;

wherein the method is carried out by at least one computing device.

2. The computer-implemented method of claim 1, wherein the deduplication operation comprises analyzing spatial and temporal locality across each of the multiple segments of the dataset.

3. The computer-implemented method of claim 1, wherein said performing a deduplication operation comprises reading a stored deduplication map.

4. The computer-implemented method of claim 3, further comprising:

updating the stored deduplication map.

5. The computer-implemented method of claim 1, wherein the multiple segments comprise multiple data blocks.

6. The computer-implemented method of claim 5, wherein each of the multiple data blocks comprises a data block of fixed size.

7. The computer-implemented method of claim 5, wherein each of the multiple data blocks comprises a data block of variable size.

8. The computer-implemented method of claim 1, further comprising:

determining whether a computation task on each of the remaining items of data has been previously performed.

9. The computer-implemented method of claim 1, further comprising:

aggregating the one or more memoized computation results corresponding to the one or more duplicate items of data.

10. A computer program product comprising a computer readable storage medium having program instructions embodied therewith, the program instructions executable by a device to cause the device to:

identify one or more duplicate items of data in a dataset on which a computation task is to be performed by (i) segmenting the dataset into multiple segments, (ii) analyzing the items of data within each segment for completeness, and (iii) performing a deduplication operation on each of the multiple segments not containing an incomplete item of data, as determined by said analyzing;

remove the one or more duplicate items of data in the dataset from the computation task;

perform the computation task on the remaining items of data in the dataset, wherein the remaining items of data comprise unique items of data in the dataset;

aggregate (i) the results of the computation task and (ii) one or more memoized computation results corresponding to the one or more duplicate items of data to generate a complete computation result for the entire dataset; and output the complete computation result for the entire dataset to a user.

11. The computer program product of claim 10, wherein the deduplication operation comprises analyzing spatial and temporal locality across each of the multiple segments of the dataset.

12. The computer program product of claim 10, wherein said performing a deduplication operation comprises reading a stored deduplication map.

13. The computer program product of claim 10, wherein the multiple segments comprise multiple data blocks.

14. The computer program product of claim 10, wherein the program instructions executable by a computing device further cause the computing device to:

determine whether a computation task on each of the remaining items of data has been previously performed.

15. The computer program product of claim 10, wherein the program instructions executable by a computing device further cause the computing device to:

aggregate the one or more memoized computation results corresponding to the one or more duplicate items of data.

16. A system comprising:

a memory; and at least one processor coupled to the memory and configured for:

identifying one or more duplicate items of data in a dataset on which a computation task is to be performed by (i) segmenting the dataset into multiple segments, (ii) analyzing the items of data within each segment for completeness, and (iii) performing a deduplication operation on each of the multiple segments not containing on incomplete item of data, as determined by said analyzing;

removing the one or more duplicate items of data in the dataset from the computation task;

performing the computation task on the remaining items of data in the dataset, wherein the remaining items of data comprise unique items of data in the dataset;

aggregating (i) the results of the computation task and (ii) one or more memoized computation results corresponding to the one or more duplicate items of data to generate a complete computation result for the entire dataset; and outputting the complete computation result for the entire dataset to a user.

17. A computer-implemented method, comprising:

identifying one or more duplicate data blocks in a dataset on which a computation task is to be performed by (i) segmenting the dataset into multiple segments, (ii) analyzing the items of data within each segment for completeness, and (iii) performing a deduplication operation on each of the multiple segments not containing an incomplete item of data, as determined by said analyzing;

removing the one or more duplicate data blocks in the dataset from the computation task;

performing the computation task on the remaining items of data in the dataset, wherein the remaining items of data comprise unique items of data in the dataset;

caching the results of the computation task for subsequent use as a memoized computation result;

aggregating (i) the results of the computation task and (ii) one or more memoized computation results corresponding to the one or more duplicate data blocks to generate a complete computation result for the entire dataset; and outputting the complete computation result for the entire dataset to a display;

wherein the method is carried out by at least one computing device.

18. The computer-implemented method of claim 17, further comprising:
controlling the size of the memoized computation results.

* * * * *